Dec. 3, 1935. R. M. CROSBIE Re. 19,771

PLUMBING FIXTURE

Original Filed April 12, 1928

INVENTOR
ROBERT M. CROSBIE
By L. G. Quesada
Attorney

Reissued Dec. 3, 1935

Re. 19,771

UNITED STATES PATENT OFFICE 19,771

PLUMBING FIXTURE

Robert M. Crosbie, Hagerstown, Md., assignor to Harlow N. Davock, Birmingham, Mich.

Original No. 1,727,428, dated September 10, 1929, Serial No. 269,456, April 12, 1928. Application for reissue April 1, 1935, Serial No. 14,181

11 Claims. (Cl. 4—192)

This invention relates to plumbing fixtures and more particularly to the water handling means thereof.

It is well known, of course, that leaky water faucets are a source of considerable annoyance and that the problem of furnishing a low cost, leak-resisting faucet valve of enduring structure is recognized as one of the first magnitude, defying solution with the result that leaky faucets are not at all uncommon and in many cases, drippings from the faucet stain the associated basin or receptacle, of whatever nature the latter happens to be. In addition, there is to be considered the fact that the noise incident to the dripping of water from a faucet to the bottom of the basin is vexatious to many people.

With an appreciation of the foregoing, the invention forming the subject of this application will be found to contemplate simple and constantly present means by which the drippings from a faucet are intercepted promptly upon the discharge thereof from the faucet and are directed into the drain of the associated basin, without first being allowed to drop to the bottom of the basin. By thus intercepting the drippings in the immediate region of the faucet, I am enabled to protect the basin against stain, due to leaky faucets, and at the same time to avoid the noise of dripping water that is so annoying to many people.

The invention also looks to a plumbing fixture in which the outlet arm or portion thereof is swivelly mounted and is so associated with the faucet valve that the flow of water from the faucet is controlled by the position of the arm. By way of more specific reference to this aspect of the invention, it is pointed out that when the arm of the faucet is in valve opening position, the free flow of water into the basin is allowed, while when the arm has been shifted to valve closing position, the outlet of such arm will overlie the means by which drippings from the faucet are intercepted.

Other objects and advantages will be apparent during the course of the following description.

Figure 1:
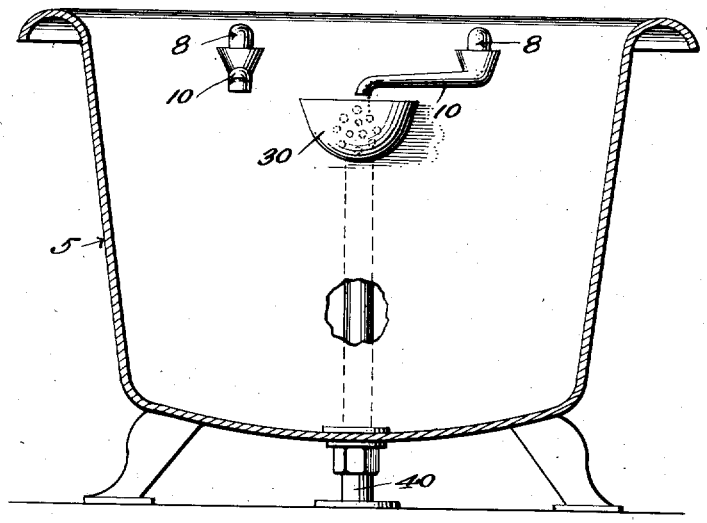
Figure 2:
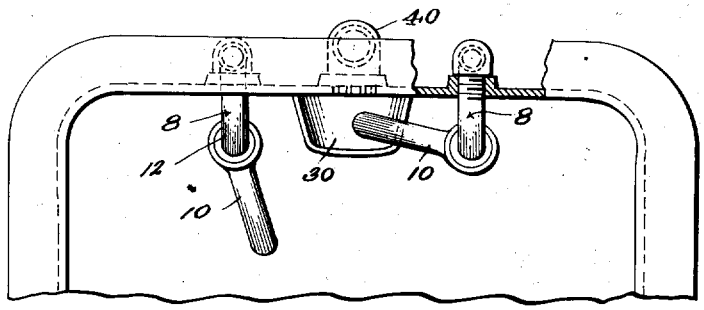
Figure 3:
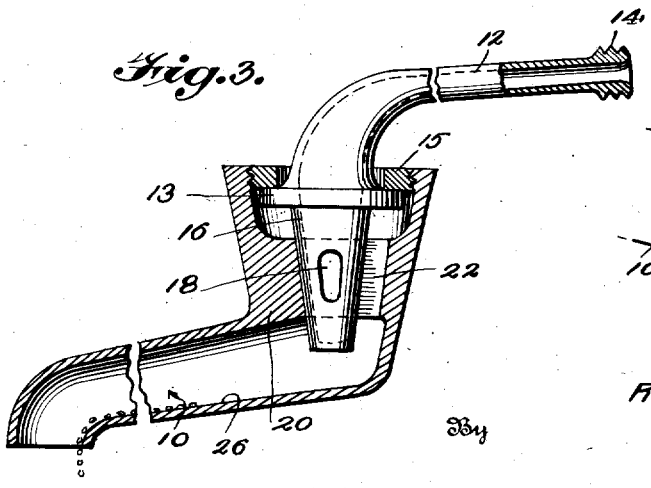
Figure 4:
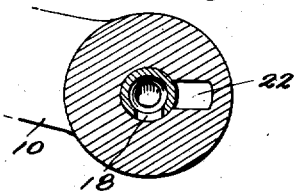

In the accompanying drawing, forming a part of this application and in which like numerals are employed to designate like parts throughout the same, Figure 1 is a vertical transverse sectional view through a bath tub embodying the invention, Figure 2 is a fragmentary plan view of a bath tub embodying the invention, parts being shown in section, Figure 3 is a central longitudinal sectional view through one of the faucets, Figure 4 is a horizontal sectional view taken on line 4—4 of Figure 3.

In the drawing, wherein for the purpose of illustration is shown a preferred embodiment of the invention, the numeral 5 generally designates a receptacle in the form of a bath tub, although, of course, the invention is in no manner restricted to use in connection with this type of plumbing fixture, it being sufficient that the receptacle be in the nature of a body having a well and a surrounding wall.

As shown in Figures 1 and 2, a water feeding means in the nature of a pair of faucets 8 are in feeding relation to the well of the tub and are provided with swivelled discharge arms or portions 10. By reference to Figure 3, it will be seen that each faucet 8 embodies a lead-in pipe 12 extending through the end wall of the tub and having one end portion thereof threaded as indicated at 14 for connection with the associated water supply pipe.

The other end portion of each lead-in pipe is in the form of a tapered plug valve element 16, hollowed, of course, and formed with a radial opening or port 18 for the discharge of water. The valve element 16 is mounted within a complemental seat 20 with which it has a rather generous area of contact and such seat is formed with a longitudinal slot or passage 22 with which the port 18 is designed to register for the free discharge of water.

As shown in Figure 3 each pipe 12 is formed with an annular flange 13 engaged by and cooperating with a retaining ring 15, threaded into the rear or upper end of the discharge portion 10, to maintain the valve element 16 in position in the seat 20 and to provide the swivelled connection between the parts 10 and 12 of the faucet.

Of course, the passage 22 is in full and constant communication with the bore 26 of the discharge portion 10, with the result that when the port 18 is in full or partial communication with the passage 22, the faucet is open for the flow of water. On the other hand, when the port 18 is closed by the surrounding valve seat 20, the flow of water is cut off.

Thus, the arm 10 provides a simple control means by which the faucet may be opened or closed and, of course, the portion or arm 10 is fully accessible for manual engagement. When the discharge arm 10 is directed forwardly from the associated lead-in pipe 12, the faucet is open. On the other hand, when the discharge arm is swung in toward the longitudinal center of the tub and toward what might be said to be the back end thereof, the free flow of water is cut off.

However, as brought out in the opening paragraph of this specification, it is a difficult problem to provide a low cost, leak-resisting valve structure for faucets, with the result that drippings from the faucet are not at all unusual.

The discharge arm 10 is shown to be inclined downward toward the outlet mouth thereof, with such outlet mouth turned downward and having what might be said to be front and rear or inner and outer lips. Clearly, leakage past the valve structure shown herein is along the bottom wall of the inclined bore 26 of the arm and downward from the rear or inner lip of the outlet mouth.

When the discharge arm 10 is in valve closing position, the outlet mouth of such arm overlies a constantly present receiver or inlet 30 in the nature of a cup forming a part of the overflow and drain system of the fixture. That is to say, when the faucet is in closed position, the downwardly directed mouth of the discharge portion 10, or more particularly the rear or inner lip of such mouth, is in overlying relation to the open top of the receiver 30. By this arrangement, drippings from the faucet are intercepted by the receiver 30 and are thus prevented from dropping to the bottom of the receptacle.

By reference to Figure 1, it will be seen that a drain pipe 40 extends from the lowermost part of the well of the tub for the reception of water therefrom and is provided with a branch pipe located exteriorly of the tub and breaking through the adjacent upstanding wall of the tub for full and constant communication with the receiver 30 embodied in the overflow and drain system.

Thus, drippings from the faucet, or more particularly the rear lip of the faucet, drop through the open top of the receiver 30 and are conducted down through the exteriorly located branch pipe of the drain and into the waste system.

With reference to the foregoing description taken in connection with the accompanying drawing, it will be seen that the constantly present receiver 30 embodied in the overflow system and associated with or incorporated in one wall of the tub provides for the interception of drippings from the faucet so as to protect the tub against discoloration due to drippings.

In addition, by providing means in the immediate region of the faucet to intercept drippings therefrom, there is avoided the objectionable noise which ordinarily accompanies the dripping of water from the faucet to the bottom of the receptacle, of whatever nature the latter happens to be.

By reason of the nature of the water control, and more particularly the arm 10, the closing of the faucet disposes the outlet of the faucet immediately above the inlet to the drain so that no special adjustment of parts is required to provide a means by which the drippings are carried off and thus prevented from dropping to the bottom of the tub.

Having thus described the invention what is claimed is:

1. In a plumbing fixture, a receptacle having a well and a wall, a water feeding means having a swivelled discharge portion in the well to furnish water thereto, and a drain extending from the lowermost point of the well and having a fixed constantly present branch exteriorly of the well and formed with an inlet cup carried by said wall, said swivelled discharge portion being movable to a position directly over said cup whereby drippings from the discharge portion are intercepted by the cup.

2. In a plumbing fixture, a receptacle having a well and a wall, a water feeding means having a swivelled discharge portion in the well to furnish water thereto, and a drain extending from the lowermost point of the well and having a fixed constantly present branch exteriorly of the well and formed with an inlet cup carried by said wall, said swivelled discharge portion being movable to a position directly over said cup whereby drippings from the discharge portion are intercepted by the cup, and a valve associated and controlled by said swivelled discharge portion.

3. In a plumbing fixture, a receptacle having a well for the reception of water, a drain having a main inlet in communication with said well and also having a fixed branch exteriorly of the well and a water supply faucet having a spout in feeding relation to said well and formed with a bore having a lower wall, said branch of the drain being formed with an inlet constantly positioned in the path of drippings from the said lower wall of the bore of said spout whereby drippings from the faucet are directed into said branch of the drain.

4. In a plumbing fixture, a receptacle having a well for the reception of water, a drain having a main inlet in communication with said well and also having a fixed branch exteriorly of the well and a water supply faucet having a spout in feeding relation to said well and formed with a bore having a lower wall, said branch of the drain being formed with an inlet constantly positioned in the path of drippings from the said lower wall of the bore of said spout whereby drippings from the faucet are directed into said branch of the drain, said inlet to the branch of said drain being in the immediate region of the spout of said faucet and in intercepting relation to drippings from said lower wall of the bore of said spout, and a valve in association with said spout and controlled thereby.

5. In a plumbing fixture, a receptacle, a drain having an inlet in communication with the receptacle and having a branch communicating with the receptacle at a point above the level of said inlet, and a faucet in feeding relation to the receptacle to furnish water thereto, said branch being provided with a constantly present inlet in the path of water dripping from the faucet and being removed from the main line of water flow from the faucet.

6. In a plumbing fixture, a receptacle having a well and a surrounding wall, a drain having an inlet in communication with said well and having a fixed branch exteriorly of said well and extending to a point above the level of said inlet, and a faucet in feeding relation to the receptacle to furnish water thereto, said branch being provided with a constantly present inlet associated with said wall, and being in the path of descent of water dripping from the faucet and being removed from the main line of water flow from the faucet.

7. In a plumbing fixture, a receptacle having a well and a surrounding wall, a water supply means extending through said wall and having a spout in feeding relation to the well to furnish water thereto, a drain having an inlet in communication with the well, said drain also having a branch exteriorly of the well and having a constantly present inlet portion extending through said wall for communication with said well, said inlet portion being in the path of descent of water dripping from the spout and being removed from the main line of water flow from the spout.

8. In a plumbing fixture, a receptacle having a well and a surrounding wall, a water supply means extending through said wall and having a discharge portion in feeding relation to the well and formed with a bore having a lower wall along which drippings travel, a drain communicating with said well at the bottom thereof and having a fixed constantly present overflow branch formed with an inlet portion communicating with the well at a point substantially above the point of communication of the main drain with the well and in the immediate region of the discharge portion of said water supply means, said inlet portion of said branch of the drain being in the path of descent of water dripping from the lower wall of the bore of said discharge portion to intercept such dripping water and being removed laterally from the main line of water flow from said discharge portion.

9. The combination with a water receiving receptacle having a drain, of a drip cup connected with said drain, and a swinging faucet designed to be positioned when not in use with the outlet overlying said drip receptacle.

10. The combination with a lavatory having a drain, of the drip receiving receptacle connected with said drain, a swinging faucet positioned to permit the outlet thereof to be swung to a position overlying said drip receptacle, and a valve controlled by the swinging of the faucet.

11. In a plumbing fixture, a receptacle having a well for the reception of water, a drain having an inlet in communication with said well and having a branch exteriorly of the well, and a water supply faucet in feeding relation to said well, said branch of the drain being formed with an inlet constantly positioned in the path of drippings from said faucet.

ROBERT M. CROSBIE.